(12) United States Patent
Leblanc et al.

(10) Patent No.: US 9,280,037 B2
(45) Date of Patent: Mar. 8, 2016

(54) MACHINE VISION CAMERA MOUNT WITH ROTATIONAL ADJUSTMENT

(71) Applicant: Serview, Inc., West Berlin, NJ (US)

(72) Inventors: Steven Leblanc, North Brunswick, NJ (US); Brian Leblanc, Williamstown, NJ (US)

(73) Assignee: Serview, Inc., West Berlin, NJ (US)

( * ) Notice: Subject to any disclaimer, the term of this patent is extended or adjusted under 35 U.S.C. 154(b) by 0 days.

(21) Appl. No.: 14/397,354

(22) PCT Filed: May 3, 2013

(86) PCT No.: PCT/US2013/039457
§ 371 (c)(1),
(2) Date: Oct. 27, 2014

(87) PCT Pub. No.: WO2013/173091
PCT Pub. Date: Nov. 21, 2013

(65) Prior Publication Data
US 2015/0241760 A1     Aug. 27, 2015

Related U.S. Application Data

(60) Provisional application No. 61/642,085, filed on May 3, 2012.

(51) Int. Cl.
*G03B 17/00* (2006.01)
*G03B 17/56* (2006.01)
(Continued)

(52) U.S. Cl.
CPC ............ *G03B 17/561* (2013.01); *F16M 11/08* (2013.01); *F16M 13/02* (2013.01); *F16M 13/022* (2013.01); *F21V 33/0052* (2013.01); *G03B 15/03* (2013.01); *F16M 2200/024* (2013.01); *F21W 2131/40* (2013.01)

(58) Field of Classification Search
USPC ................... 396/419, 420, 428; 348/373–374
See application file for complete search history.

(56) References Cited

U.S. PATENT DOCUMENTS

| 866,257 A | 9/1907 | Case |
| 2,795,973 A | 6/1957 | Molitor |

(Continued)

FOREIGN PATENT DOCUMENTS

| EP | 0986251 A | 3/2000 |
| GB | 2476970 A | 7/2011 |
| WO | 03064116 A | 8/2003 |

*Primary Examiner* — Minh Phan
(74) *Attorney, Agent, or Firm* — Fox Rothschild LLP; Richard C. Woodbridge; Glenn M. Massina (57) ABSTRACT

A camera mount apparatus is disclosed that allows toolless rotation with integrated detent and locking features. The apparatus has the ability to rotate a camera and lens predetermined increments. In the preferred embodiment, the camera and lens are constrained together, and rotate about the optical axis. One portion of the apparatus remains fixed while another portion rotates and slides, allowing the camera and light to be rotated in a controlled fashion. The apparatus has a hand retractable pin that locks rotational movement and that is released manually to allow rotation adjustment The apparatus has spring plungers that mate to spherical indented features to provide a function to allow a positive feel when the desired angular position is achieved during rotation. The apparatus has bearing surfaces that allow rotation and provide contact of bearing material on rotational sliding faces to metal contact.

12 Claims, 8 Drawing Sheets

(51) Int. Cl.
*G03B 15/03* (2006.01)
*F16M 11/08* (2006.01)
*F16M 13/02* (2006.01)
*F21V 33/00* (2006.01)
*F21W 131/40* (2006.01)

(56) References Cited

U.S. PATENT DOCUMENTS

| | | |
|---|---|---|
| 2,813,456 A | 11/1957 | Ostrov |
| 3,758,205 A | 9/1973 | Oxbery |
| 3,905,700 A | 9/1975 | Christie |
| 4,535,412 A | 8/1985 | Cederquist |
| 4,573,073 A | 2/1986 | Corby, Jr. |
| D283,031 S | 3/1986 | Sadre-Marandi et al. |
| 4,723,075 A | 2/1988 | German |
| 4,931,866 A | 6/1990 | Charlesworth et al. |
| 4,978,986 A | 12/1990 | Hatch |
| 5,671,449 A | 9/1997 | Shimizu |
| 5,714,998 A | 2/1998 | Wheeler |
| 5,752,113 A | 5/1998 | Borden |
| 5,765,060 A | 6/1998 | Shimizu |
| 6,202,961 B1 | 3/2001 | Wilke et al. |
| 6,430,371 B1 | 8/2002 | Cho |
| 6,471,363 B1 | 10/2002 | Howell et al. |
| 6,554,452 B1 | 4/2003 | Bourn et al. |
| 6,793,415 B2 | 9/2004 | Arbuckle |
| 6,947,666 B2 | 9/2005 | Chapman et al. |
| 6,986,294 B2 | 1/2006 | Fromme et al. |
| 7,196,719 B2 | 3/2007 | Koselka et al. |
| D591,324 S | 4/2009 | Sukhov |
| D623,682 S | 9/2010 | Volpato |
| 8,081,207 B2 | 12/2011 | Barman et al. |
| 8,186,893 B1 * | 5/2012 | Patterson et al. .............. 396/428 |
| 8,215,540 B2 | 7/2012 | Szesko et al. |
| 8,374,498 B2 | 2/2013 | Pastore |
| 2006/0115264 A1 | 6/2006 | Vezard et al. |
| 2009/0059038 A1 | 3/2009 | Seakins et al. |

\* cited by examiner

MACHINE VISION CAMERA MOUNT WITH ROTATIONAL ADJUSTMENT

CROSS REFERENCE TO RELATED APPLICATIONS

This application is an international application filed under the Patent Cooperation Treaty and claims priority to U.S. Provisional Application Ser. No. 61/642,085 filed May 3, 2012, which is incorporated by reference as if fully disclosed herein.

FIELD OF THE INVENTION

The present disclosure is in the technical field of camera mounts and brackets, namely, camera mounts with toolless rotational adjustment about an optical axis.

BACKGROUND OF THE INVENTION

Machine vision inspection is an integral component of many industrial processes. Machine vision systems are comprised of various components including a camera, lens, lighting elements, and mounting brackets to allow proper placement inside machinery. Though machine vision has been widely adopted and accepted by industry, there has been a continuing need for improvements in mounting brackets to allow rapid and repeatable positional adjustment of the camera and/or camera and lighting for production format changeovers to allow imaging of varying positions of camera field of view.

Numerous devices for the mounting of cameras have been developed. For example, U.S. Pat. No. 3,758,205 discloses a photographic stand with a camera supporting plate positioned centrally and above the work surface, a frame carrying both the work surface and camera supporting plate and having means for holding light sources for illuminating the work surface and a rotatable camera mount on the camera supporting plate.

U.S. Pat. No. 5,714,998 discloses an inspection system for use with a moving conveyor having a video camera mounted above the conveyor and first and second prisms mounted below the camera but above the part to be inspected. The prisms are oriented to be parallel to two opposite ends of the part to be inspected. Therefore, as the conveyor moves the part below the prisms to an inspection location between the prisms, the camera provides simultaneous images of the ends of the part as well the part's upper surface.

European Patent Application No. 0 986 251 discloses an apparatus for the orthogonal (X,Y) movement which allows high-resolution color photography in both the X and Y directions, by micro-movement of the CCD sensor within a digital camera body is provided which can be used together with a rotatable mount for rotating the CCD sensor from portrait mode to landscape mode, without needing to rotate the camera base.

U.S. Pat. No. 6,986,294 discloses an automated instrument package (AIP) suited to mount on the inside ceiling of a large silo. The gimbaled AIP vertical mounting bracket rotates in an approximate 360° azimuth. An instrument housing is mounted to the vertical mounting bracket, and it rotates approximately 190° in a vertical plane. The instrument housing has at least one range finding sensor such as a scanning laser to measure the top surface contours of the bulk material. The instrument housing can also contains other sensors such as air and quality instruments including temperature, humidity, spectral recognition sensor to detect grain/material type and/or flow rate, gas detectors for sniffing off-odors/spoilage/or safety problems, and live video.

Other references that are relevant include U.S. Pat. No. 866,257; U.S. Pat. No. 4,978,986; U.S. Patent Application Publication No. 2009/0059038; and U.S. Pat. No. 8,374,498. However, none of the disclosures provided in these references are suitable for rapid and repeatable positional adjustment of the camera and/or camera and lighting for production format changeovers to allow imaging of varying positions of camera field of view in machine vision applications.

SUMMARY OF THE INVENTION

In an embodiment, a camera mount apparatus has the ability to rotate a camera and lens in increments of 90 degrees about the optical axis, including the angles of 0, 90, 180 and 270 degrees. In one configuration, the camera, lens and a light are constrained together, and rotate about the optical axis. One portion of the apparatus remains fixed as another portion rotates and slides, allowing the camera, lens and light to be rotated in a controlled fashion. In another configuration, the camera and lens are constrained together, and rotate about the optical axis while the light does not rotate.

In the embodiment, the apparatus has a hand retractable spring plunger that locks rotational movement unless it is released manually to allow rotation adjustment. The apparatus has spring loaded pins (spring plungers) that mate to spherical indented features to provide a detent function to allow a positive feel when the desired angular position is achieved during rotation. The apparatus has bearing surfaces that allow rotation and provide contact of bearing material on rotational sliding faces to reduce metal to metal contact.

The apparatus provides toolless rotation with integrated detent and locking features. The rotational function occurs at the interface between the camera and lens. This rotation function could also be positioned at other planes and positions but the interface of the camera/lens is an especially beneficial zone to locate the rotation function and to minimize the overall size of the device and optics, camera and lighting.

DETAILED DESCRIPTION OF THE INVENTION

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art.

Nothing in this disclosure is to be construed as an admission that the embodiments described in this disclosure are not entitled to antedate such disclosure by virtue of prior invention. As used in this document, the term "comprising" means "including, but not limited to."

In the context of machine vision cameras, it is common that the camera sensor array, e.g., a charge-coupled device (CCD) or complementary metal-oxide-semiconductor (CMOS) camera, has a rectangular configuration with an aspect ratio that is not square, i.e., where one dimension of the array is larger than the other. It is beneficial to be able to rotate the camera about the optical axis, thus repositioning the array to allow viewing of an inspection focal plane at the optimal angular orientation.

The device comprises a rotational element to allow movement of combined groups of optical components (e.g., camera, lens, and light) to be rotated in groups about the optical axis while some portions of the bracket remain fixed, and provide detent and locking features. In further embodiments, other optical elements and devices could be added to the form in a combined group such as prisms, beam splitters, mirrors, filters, and the like. The combined group rotates as an assembly about the optical axis of the camera/sensor and lens. A pentaprism mounted in such an arrangement will allow rotation of the optical image without requiring rotation of the camera/array combination, the lens, or lighting. Multiple groups of the optical elements, camera/sensor, lens and devices can be stacked together and moved as subgroups together.

Figure 1:
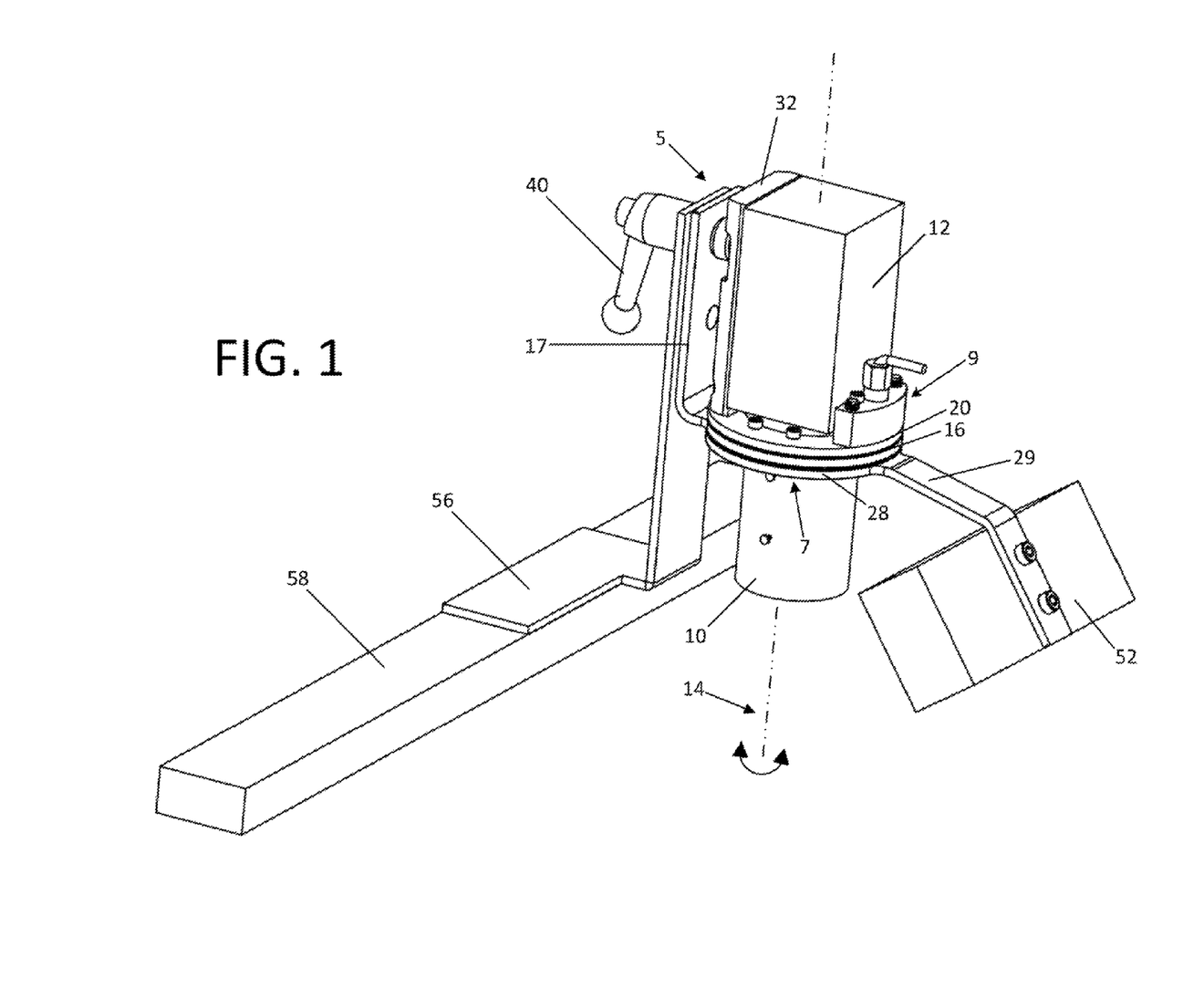
FIG. 1 is a perspective view of a camera mount apparatus.

Referring now to FIG. 1, a camera mount assembly 5 and a camera 12 having a lens 10 are shown. Camera 12 may be attached to camera mount assembly 5 via camera mount block 32. Mount block 32 may be attached to upper ring 20 so that camera 12 and upper ring 20 are fixed relative to each other. Assembly mount bracket 17 may be attached to adapter bracket 56 and/or directly to wall member 58. In the embodiment illustrated in FIG. 1, assembly mount bracket 17 and adapter bracket 56 are attached to each other with handle 40. One of skill in the art will recognize that any method of fixing assembly mount bracket 17 and adapter bracket 56 may be utilized. Additionally, assembly mount bracket 17 may be directly connected to wall member 58.

Camera mount assembly 5 also includes ring assembly 7 through which the lens 10 is inserted. In a preferred embodiment, ring assembly 7 includes a center ring 16, an upper ring 20, and a lower ring 30. In the embodiment illustrated in FIG. 1, the center ring 16 is attached to assembly mount bracket 17. One of skill in the art will recognize that center ring 16 and assembly mount bracket 17 may be formed from a single piece of material. This embodiment also includes lock assembly 9 which includes a number of elements described in greater detail below. This embodiment optionally includes a light bracket 28 and light 52. Although the embodiment illustrated in FIG. 1 includes assembly mount bracket 17 and light bracket 28, one of skill in the art will recognize that these brackets are meant to serve particular applications. Although lower ring 30 and light bracket 28 are shown in FIG. 1 as a single piece, one of skill in the art will note that light bracket 28 may be a modular addition. The embodiments of the present disclosure are not limited in this regard.

One of skill in the art will appreciate that a device built in accordance with the present disclosure has the ability to rotate a camera (e.g., camera 12), and lens (e.g., lens 10) in increments of 90 degrees about an optical axis 14, including the angles of 0, 90, 180 and 270 degrees. The ring assembly can be configured to rotate in discrete angles other than 90 degrees (such as 30 degrees, 45 degrees) without limitation.

In one example configuration, the camera 12, lens 10, and a light bracket 28 are constrained together, and rotate about the optical axis. One portion of the device remains fixed as the other sections rotate and slide, allowing the camera 12 and light 52 to be rotated in a controlled fashion. In another example configuration, the camera 12 and lens 10 are constrained together to rotate about the optical axis while the light bracket 28 does not rotate.

In a preferred embodiment, shown in FIG. 1, the device provides toolless rotation with integrated detent and locking features. In an embodiment, the rotational function occurs at the zone/area/space where the interface between the camera 12 and lens 10 occurs. This rotation function could also be positioned at other planes and positions but the interface of the camera/lens is an especially beneficial zone to locate the rotation function and to minimize the overall size of the device and optics, camera and lighting. For example, there is typically a zone between the camera 12 and the lens 10 having an area of reduced diameter. By positioning the ring assembly 7 in the zone between the camera 12 and the lens 10, the device can be made smaller in diameter and size. Positioning the device at this location leaves the area behind the camera 12 clear where cables typically exit (not shown in FIG. 1). Positioning the device at this location allows the lens 10 to be attached directly to the camera 12 and provides access to the focus and aperture adjustment settings of the lens 10 without interference from the camera mount assembly 5. Additionally, the lens 10 may change size due to movement of optical elements along the optical axis 14 during focal adjustment. By placing the device between the lens 10 and the camera 12, the area in front of the lens 10 is left clear thereby allowing movement of optical elements, if necessary, during focusing. Positioning the ring assembly 7 at this location allows the removal and installation of the lens without disassembly of the ring assembly 7.

Typically, C Mount lenses are commonly used. CS Mount lenses are also used which are similar except for the addition of a 5 mm extension tube. The device may be configured to work with standard C and CS lens mounts. The embodiments of the present disclosure are not limited with regard to lens size. This device will work with other mounting formats such as the Nikon® F mount and other standard mounts. As lenses and cameras vary in size, the geometry and functions may be scaled to suit any size camera and lens combination.

The design may be optimized to produce a narrow diameter and thickness which results in a minimized required working envelope of the camera mount as it is moved through the range of angular motion. This is a benefit on machines where space is constrained, and is a desirable feature and benefit of this device. This device can be attached to other brackets and other degrees of freedom and motion can be provided in conjunction with this device. These other degrees of freedom can be multi axis translation and multi axis rotation.

Figure 2:
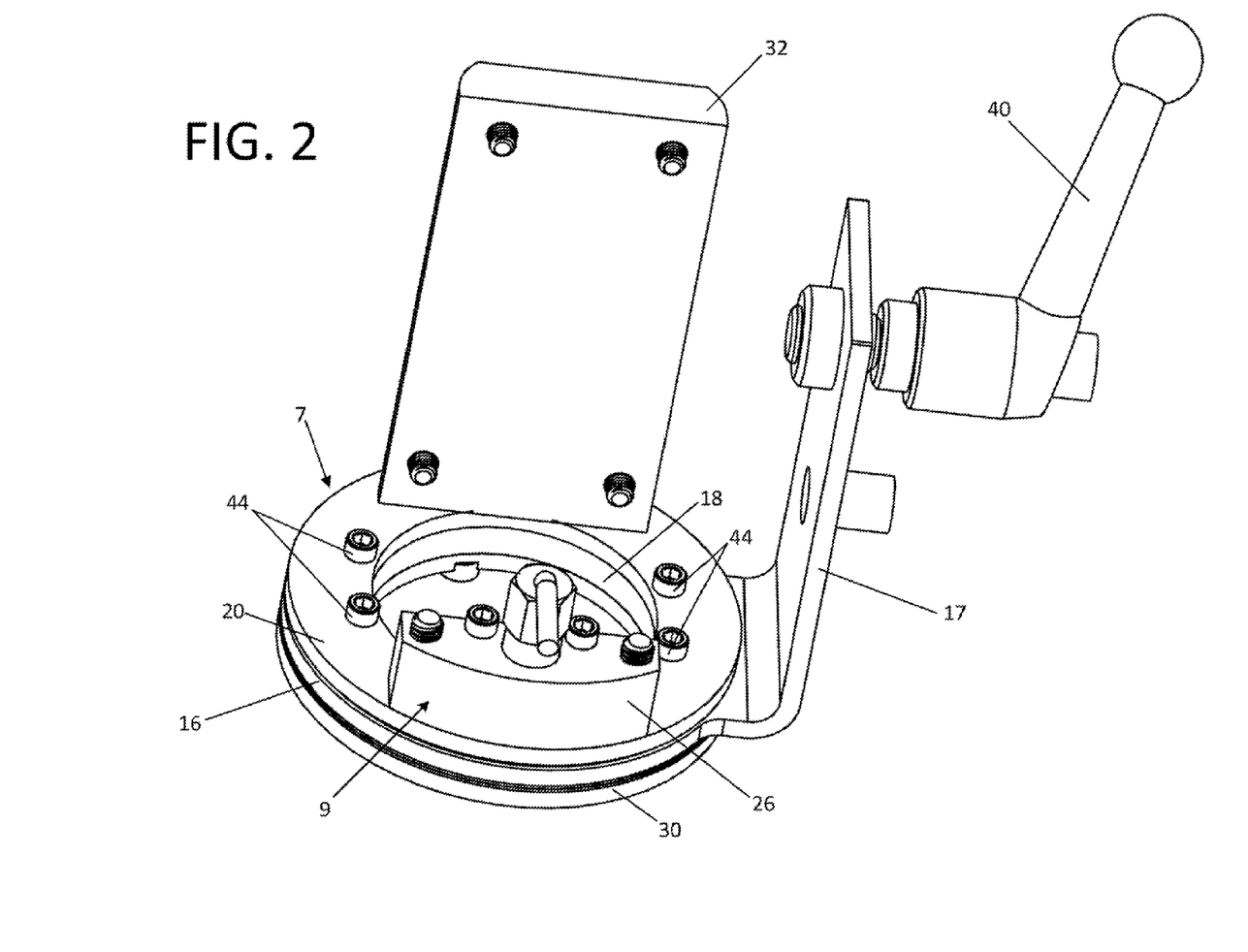
FIG. 2 is a perspective view of a ring assembly.

Referring now to FIG. 2, an isometric view of ring assembly 7. In the embodiment shown in FIG. 2, camera mount block 32, assembly mount bracket 17 with handle 40, and lock assembly 9 (via spring pin mount block 26) are attached to ring assembly 7. Upper ring 20, inner ring 18, and lower ring 30, shown in FIG. 2 without light bracket 28, are attached together with fasteners 44 to form ring assembly 7. As will become apparent below, center ring 16 remains fixed to a wall or other support (as shown in FIG. 1) while the camera mounted on ring assembly 7 is able to rotate relative to the center ring 16 and the wall support.

Figure 3:
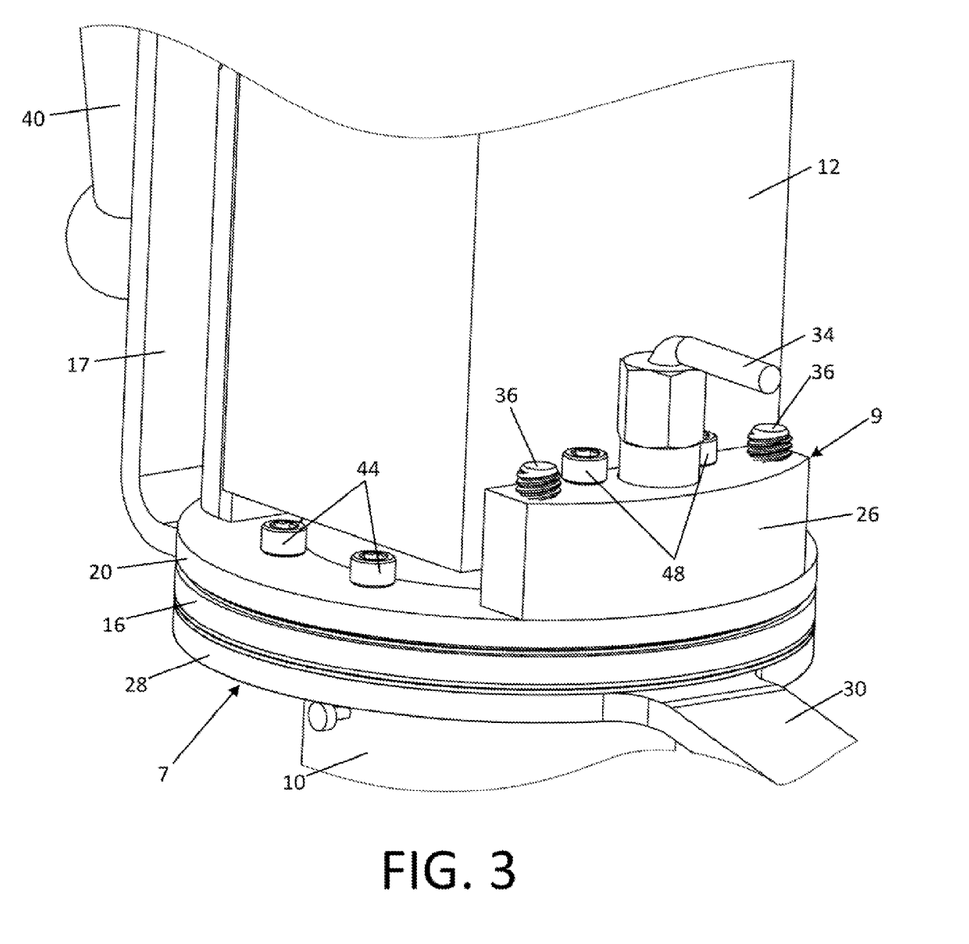
FIG. 3 is a detail view of a ring assembly.

Referring now to FIG. 3, a detail view of ring assembly 7 and lock assembly 9 is shown. Upper ring 20 and lower ring 30 (with light bracket 28) are fixed relative to each other with fasteners 44. Also attached to upper ring 20 and lower ring 30 is inner ring 18, not shown in FIG. 3. A more detailed view of lock assembly 9 is also shown in FIG. 3. Spring pin mount block 26 is fixed to upper ring 20 (and inner ring 18 and lower ring 30) with fasteners 48, which are longer than fasteners 44 to accommodate the spring pin mount block 26. Spring plunger bolts 36 and retractable pin 34 are also included in spring pin mount block 26. As will become apparent below, retractable pin 34 is operative to lock ring assembly 7 (i.e. the fixed assembly of upper ring 20, inner ring 18 (not shown in FIG. 3), and lower ring 30.

Figure 4:
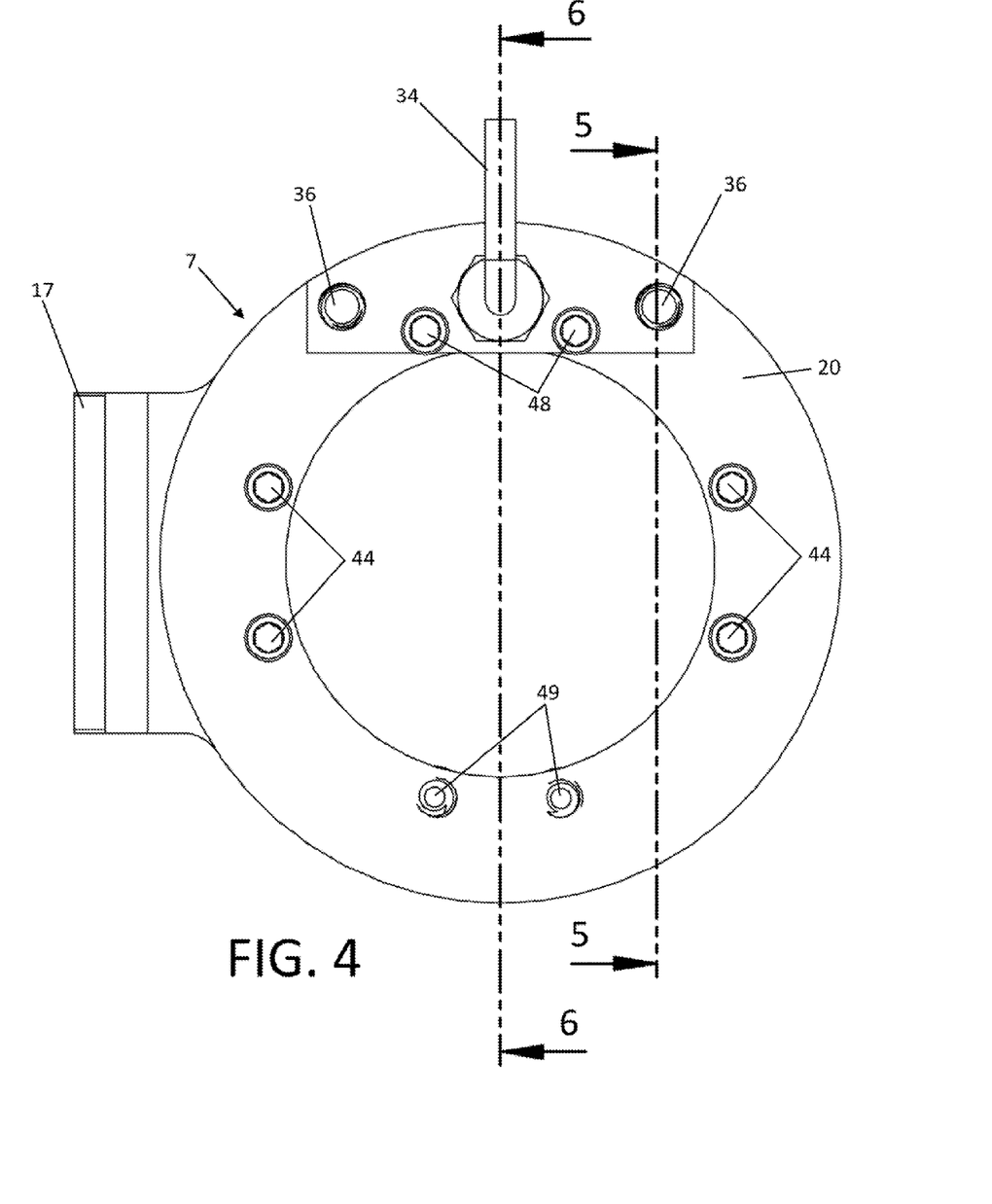
FIG. 4 is a plan view of a ring assembly.

Referring now to FIG. 4, a plan view of the top of ring assembly 7 is shown without camera mount block 32. Camera mount block apertures 49 are shown. In the embodiment shown in FIG. 4, the camera mount block 32 attaches to ring assembly 7 (i.e. upper ring 20, inner ring 18 (not shown in FIG. 4), and lower ring 30 (not shown in FIG. 4)) via fasteners inserted into upper ring camera block apertures 49. Fasteners 44 and 48 are also shown. Also shown on FIG. 4 are two lines 5-5 and 6-6 which each define a cross section plane for the cross-sections illustrated in FIGS. 5 & 6, described below.

In an example, two types of devices are used for constraint and locking of the moveable assembly. One component is retractable pin 34 and one of these is used. Another component is the spring plunger bolt 36 that is a type of set screw with a built in spring and plunger in the center with a spherical shape on the tip. The spring plunger 36 is used to provide a detent function and to provide a positive lock and spring loaded pressure from the spring loaded pin inside the spring plunger 36 against the fixed portion of the assembly.

Figure 5:
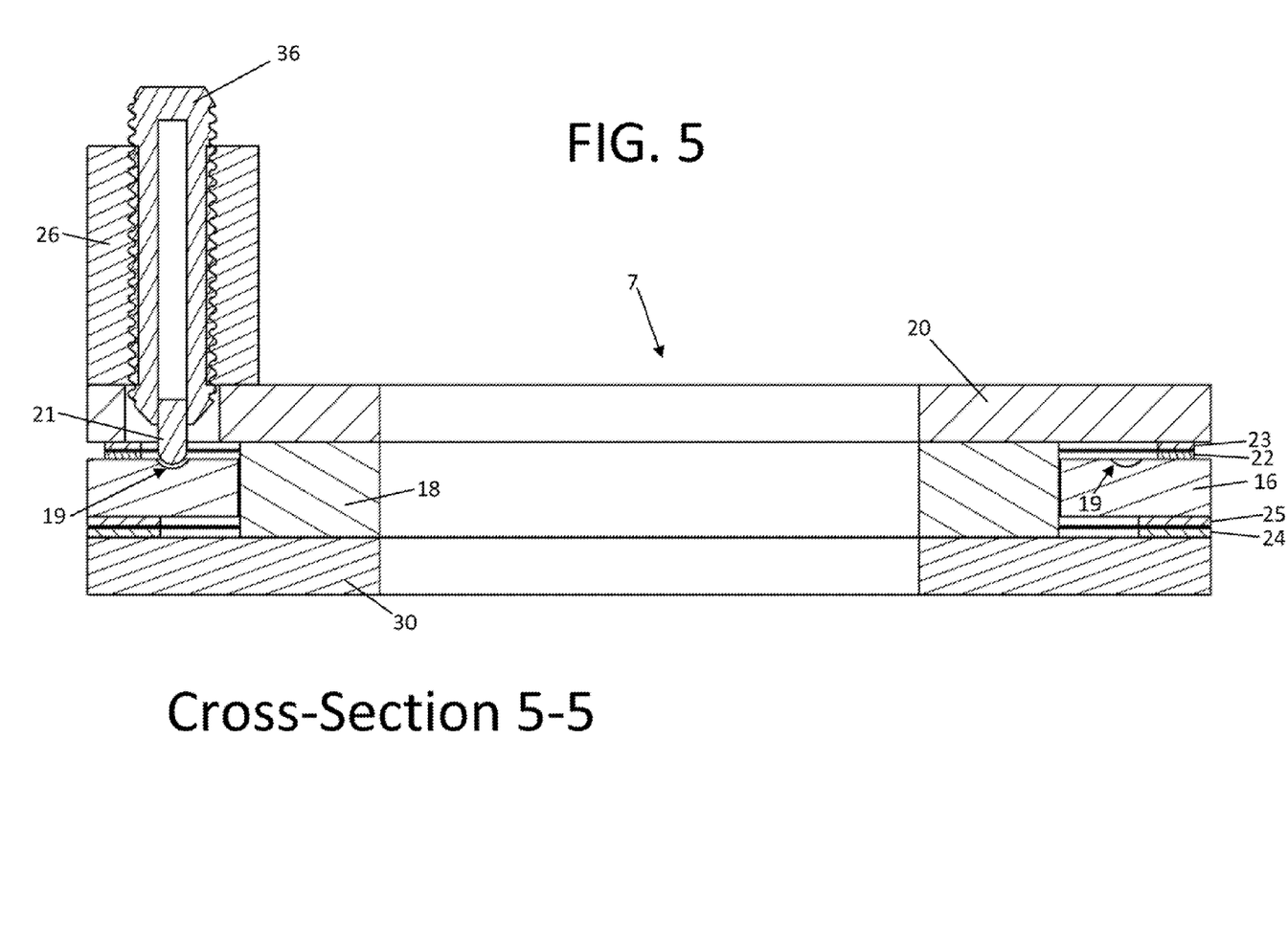
FIG. 5 is a cross-section view of a ring assembly from perspective 5-5.

Referring now to FIG. 5, cross-section 5-5 of the ring assembly 7 is shown. Ring assembly 7 includes upper ring 20, inner ring 18, lower ring 30 and center ring 16. Spring plunger mount block 26 is attached to upper ring 20 and includes spring plunger bolt 36 having a spring 31 and spring plunger 21. On the upper surface of center ring 16, a number of depressions 19 are included. As shown in FIG. 5, spring plunger 21, biased by spring 31, fits within depression 19 to provide a detent function to allow a positive feel when the desired angular position is achieved during rotation. These detents may be spaced such that they occur in repeating patterns radially about the part as an internal feature.

A number of bearing rings 22, 23, 24, 25 are included between the upper and lower rings and the center ring, respectively. Bearing ring 22 is attached to the upper surface of the center ring 16. Bearing ring 23 is attached to the lower surface of the upper ring 20. Bearing ring 24 is attached to the upper surface of the lower ring 30. Bearing ring 25 is attached to the lower surface of center ring 16. In an embodiment, bearing rings are composed of polytetrafluoroethylene (PTFE or Teflon®). However, one of skill in the art will recognize that the bearing rings may be composed of any bearing material that assists in reducing friction between the constituent rings of ring assembly 7. Suitable bearing material may include ultra-high molecular weight (UH-MW) plastic, polyoxymethylene (POM), polyamides (i.e. Nylon). Alternate methods of reducing friction include surface coating and surface impregnations which would eliminate the need for bearing elements. Alternatively, the rings may be composed of the bearing material, e.g. PFTE, POM, UHMW plastic, and the like, eliminating the need for additional bearing elements while maintaining structural integrity. Alternative bearing forms include ball bearings, needle bearings, roller bearings, V-groove bearings, and the like.

Figure 6:
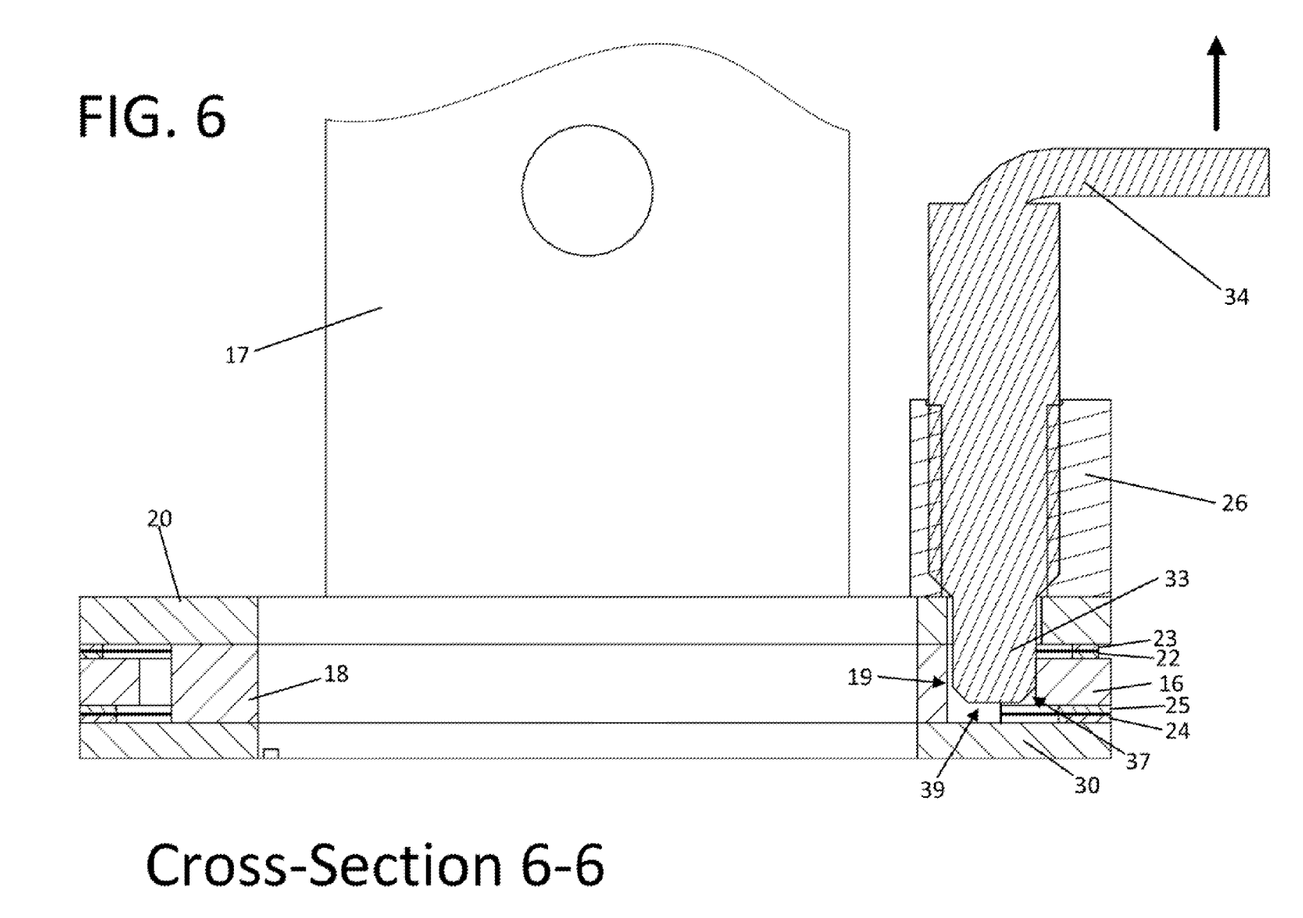
FIG. 6 is a cross-section view of a ring assembly from perspective 6-6.

Referring now to FIG. 6, cross-section 6-6 is shown. Again shown is upper ring 20, inner ring 18, lower ring 30, and center ring 16. Spring plunger mount block 26 is also shown including retractable pin 34 having a pin tip 33. In an embodiment, pin tip 33 may be spring loaded, via spring 29, to allow for locking and unlocking through use of retractable pin 34. As shown in FIG. 6, center ring 16 includes a center ring notch 35. Inner ring 18 includes an inner ring notch 37. When center ring notch 35 and inner ring notch 37 are aligned, they form pin receiver recess 39. When pin tip 33 is inserted into pin receiver recess 39, the ring assembly 7 is locked in place relative to center ring 16. Referring again to FIG. 1, through use of the pin tip 33 (shown in FIG. 6), the camera 12, attached to upper ring 20 via camera mount block 32, can be rotated about the optical axis of the camera and locked in place when the desired position is reached.

Figure 7:
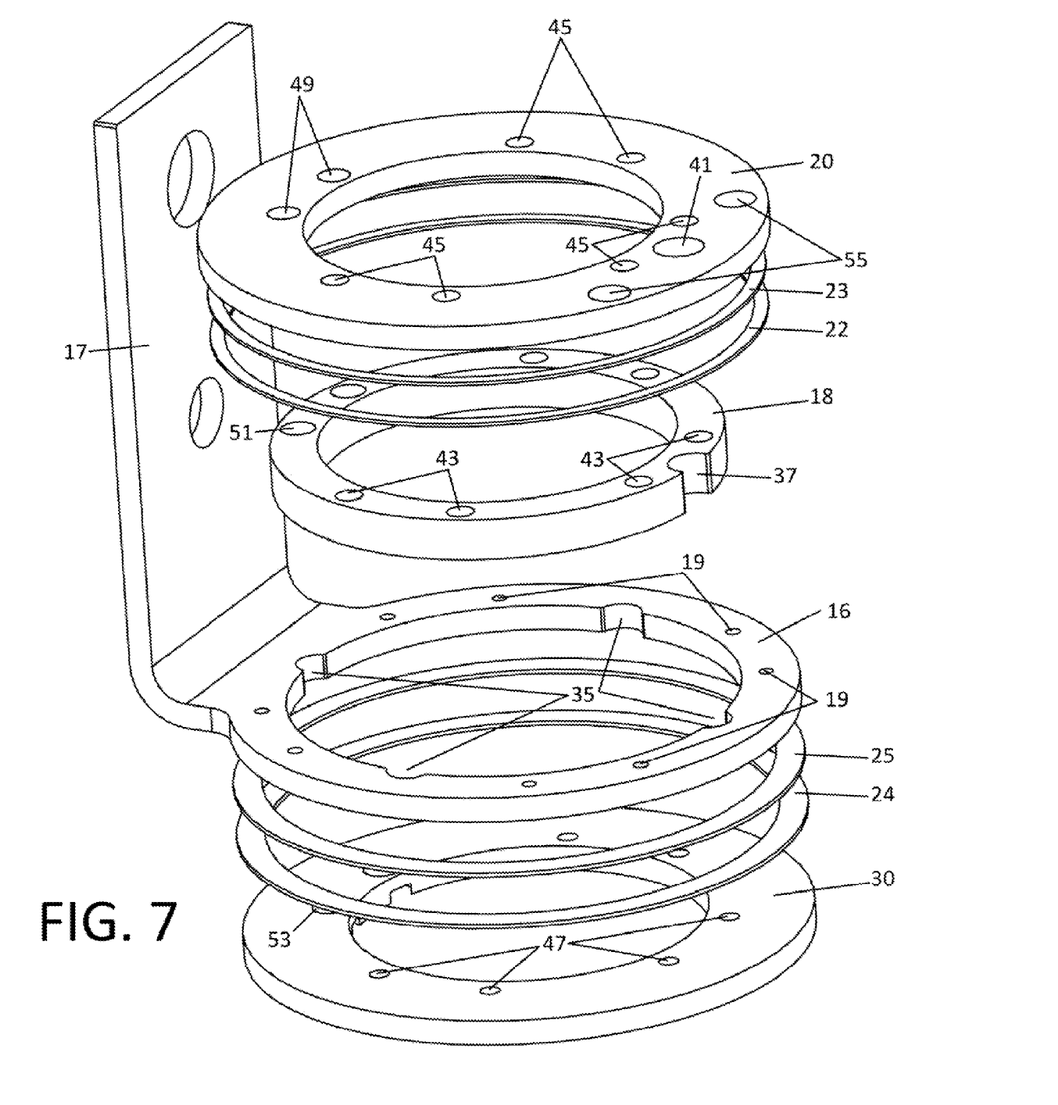
FIG. 7 is an exploded view of a ring assembly.

Referring now to FIG. 7, an exploded view of an embodiment of the ring assembly 7 is shown. In this embodiment, ring assembly 7 includes upper ring 20, bearing rings 22, 23, inner ring 18, center ring 16, bearing disks 24, 25, and lower ring 30. Upper ring 20 includes upper ring fastener apertures 45, upper ring camera block fastener apertures 49, spring plunger apertures 55 and pin aperture 41. Upper ring fastener apertures may be adapted to accept fasteners 44 and/or 48. Inner ring 18 includes inner ring fastener apertures 43, inner ring camera mount fastener apertures S1 and inner ring notch 37. Lower ring 30 includes lower ring apertures fastener apertures 47 and lower ring camera mount fastener apertures 53. Upper ring apertures 45, 49 are aligned with inner ring apertures 43, 51 and lower ring apertures 47, 53 and fasteners 44, 48 are inserted to fasten the upper ring 20, inner ring 18, and lower ring 30 to form ring assembly 7. Center ring 16 includes center ring notches 35 and center ring depressions 19. As described above, inner ring notch 37 may align with one of center ring notches 35 to form pin receiver recess 39 (shown in FIG. 6). Ball detent 21 of spring plunger 36 fits within center ring recesses 19 to assist with ring assembly 7 locking in place.

In an example configuration, a group of components (e.g., ring assembly 7) are grouped together in a stacked arrangement that remain fixed with respect to each other. This group can rotate and slide so that motion is allowed for the group about the optical axis, while the rest of the assembly remains fixed. A set of spring plungers 21 make contact with spherical depressions (e.g. depressions 19) in the fixed portion to create the detent function. This set could be one, two, or more spring plungers. In an example configuration, two spring plungers are included. This configuration with two spring plungers is beneficial because the forces from two plungers contact the fixed ring at two points giving increased rigidity of the unit when in the detent position, and reducing play in the bearings. Using one spring plunger would allow for a finer resolution of angular adjustment but would potentially not be as rigid due to the existence of a pivot point allowing for more motion and play than a configuration where two or more spring plungers are used. In a preferred embodiment, the spring pins are located on the moving/rotational portion of the ring assembly 7 as shown in FIG. 1. Alternatively, the spring plungers can remain fixed by mounting them onto assembly mount bracket 17, and repositioning the detent features (i.e. depressions 19) onto upper ring 20 or lower ring 30.

Figure 8:
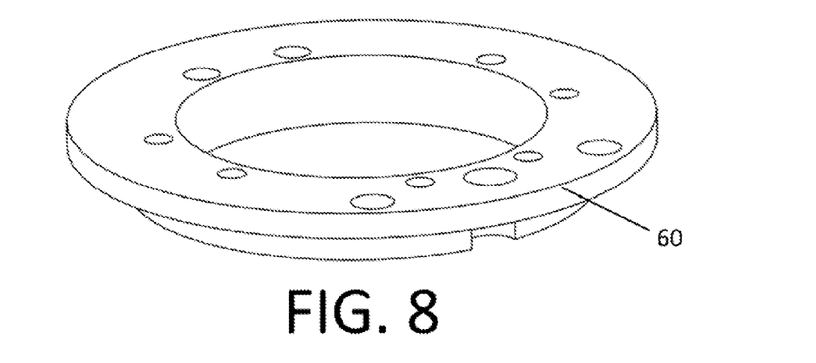
FIG. 8 is an embodiment of a composite ring.
Figure 9:
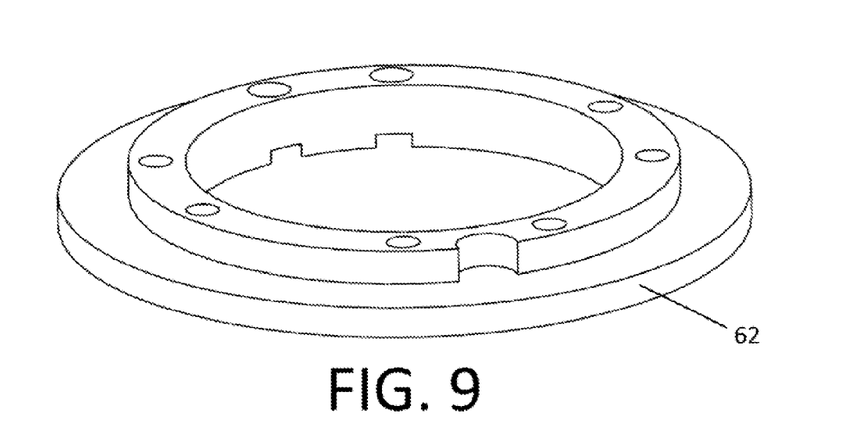
FIG. 9 is an embodiment of a composite ring.
Figure 10:
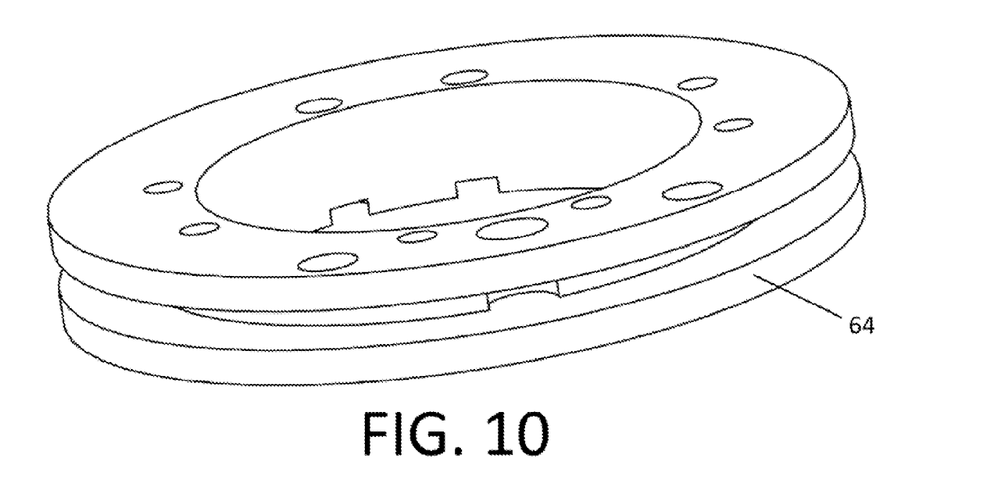
FIG. 10 is an embodiment of a composite ring.

Referring now to FIGS. 8-10, various embodiments of a ring assembly are shown. In one embodiment, shown in FIG. 8, the upper ring and inner ring are constructed out of a single piece of material to form upper composite ring 60. A center ring and a lower ring (both not shown in FIG. 8) can be included to form a complete ring assembly. In a second embodiment shown in FIG. 9, the inner ring and the lower ring are constructed out of a single piece of material to form lower composite ring 62. An upper ring and a center ring (both not shown in FIG. 9) can be included to form a complete ring assembly. In a third embodiment shown in FIG. 10, the upper, lower, and inner rings are constructed out of a single piece of material to form composite ring 64. A center ring may be included to form a complete ring assembly.

One specific application where this device can be applied is in scanning of barcodes. It may be of benefit to rotate the long axis of the camera sensor array to match the long axis of the barcode to provide optimal viewing and efficient use of the camera array in viewing the barcode. Another specific application is in inspection of labels for pharmaceutical products. It may be of benefit to rotate the camera and array to match optimal field of view coverage for desired objects such as one-dimensional (1D) and two-dimensional (2D) barcodes, printed lot code, printed date code, printed expiration codes, pre-printed component number, text, graphics, logos or combinations of these and other items. By rotating the camera to match the optimal orientation the inspection is enhanced, proper resolution and magnification is maintained and most efficient use of the camera array is obtained. Similar benefits may be obtained across all machine vision inspection applications where the camera rotation may benefit the setup. This is also a statement that applies to any 1D and 2D barcode scanning applications. This rotation of the sensor array can also be applied to both fixed and moving beam bar code scanning applications.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed is:

1. A rotationally adjustable camera mount apparatus (5) having a ring assembly (7) concentrically surrounding an optical axis (14) of a camera (12), the ring assembly (7) comprising:
    a first ring (20) having a first aperture (41) and a mount (32) for attaching the camera (12);
    a second ring (18), rotationally fixed to the first ring (20), having a first notch (37) aligned with the first aperture;
    a third ring (16), configured to concentrically fit about the second ring (18), having a second notch (35), wherein the first notch (37) and the second notch (35), when aligned, form a recess (39) aligned with the first aperture (41), and at least one depression (19);
    a fourth ring (30) rotationally fixed to the first and second ring (20, 18);
    at least one bearing (22, 23, 24, 25) between the first and third rings (20, 16) and the third and fourth rings (16, 30); and
    a lock assembly (9), fixed to the first ring (20), having a retractable pin (34) aligned with the first aperture (41) and at least one plunger pin (21) adapted to contact the at least one depression (19),
    wherein, the camera (12), when attached to the first ring (20), is rotatable about the optical axis (14) and wherein the rotation of the camera (12) relative to the third ring (16) is locked when the first notch (37) and the second notch (35) are aligned and the retractable pin (34) is inserted into the recess (39).

2. The apparatus of claim 1, wherein the ring assembly comprises two pairs of depressions (19) and plunger pins (21), wherein each pair is positioned on either side of the second notch (35).

3. The apparatus of claim 2, wherein the third ring (16) comprises a plurality of pairs of depressions (19) and a plurality of notches (35), wherein the camera (12) is rotatable in a number of increments equal to the number of notches (35) in the third ring (16).

4. The apparatus of claim 3, wherein the number of notches (35) in the third ring (16) is 4 and the camera (12) is rotatable in 90° increments.

5. The apparatus of claim 3, wherein the number of notches (35) in the third ring (16) is 3 and the camera (12) is rotatable in 120° increments.

6. The apparatus of claim 3, wherein the number of notches (35) in the third ring (16) is 6 and the camera (12) is rotatable in 60° increments.

7. The apparatus of claim 3, wherein the number of notches (35) in the third ring (16) is 8 and the camera (12) is rotatable in 45° increments.

8. The apparatus of claim 3, wherein the number of notches (35) in the third ring (16) is 12 and the camera (12) is rotatable in 30° increments.

9. The apparatus of claim 3, further comprising a light bracket (28) having a light (52) directed to the field of view of the camera (12).

10. The apparatus of claim 9 further comprising a mounting bracket (17) for attaching the apparatus to a surface.

11. The apparatus of claim 1, wherein at least two of the first, second, and fourth rings (20, 18, 30) are constructed from a single piece of material.

12. A rotationally adjustable camera mount apparatus comprising:
    a rotational member (7) comprising an upper portion (20) having a first aperture (41) and an inner portion (18) having a first notch (37) aligned with the at least one aperture (41);
    a bracket member (17) attached to a surface, said bracket member (17) including a ring (16) having an upper surface with at least one depression (19), wherein the inner portion (18) of said rotational member (7) is adapted to concentrically fit within said ring (16), and the interior of said ring includes a second notch (35), wherein the first notch (37) and the second notch (35), when aligned, form a circular recess (39) aligned with said first aperture (41) of the upper portion (20); and
    a lock assembly (9) having a retractable pin (34) and at least one plunger pin (21), the lock assembly (9) fixed to the upper portion (20) of the rotational member (7), wherein the retractable pin (34) is aligned with the first aperture (41),
    wherein in a first condition when the first notch (37) of the inner portion (18) and the second notch (35) are aligned, the retractable pin (34) is inserted into the recess (39) and the at least one plunger pin (21) is inserted into the at least one depression (19) such that said rotational member (7) is locked relative to the bracket member (17), and in a second condition when the first notch (37) and the second notch (35) are not aligned, the rotational member (7) is allowed to rotate relative to the bracket member (17).

* * * * *